(12) United States Patent
Burkhardt et al.

(10) Patent No.: US 10,982,609 B2
(45) Date of Patent: Apr. 20, 2021

(54) METHOD AND DEVICE FOR CONTROLLING AN INTERNAL COMBUSTION ENGINE SUPERCHARGED BY AN EXHAUST-GAS TURBOCHARGER

(71) Applicant: CPT Group GMBH, Hannover (DE)

(72) Inventors: Thomas Burkhardt, Neutraubling (DE); Jürgen Dingl, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/553,805

(22) Filed: Aug. 28, 2019

(65) Prior Publication Data

US 2019/0383227 A1   Dec. 19, 2019

Related U.S. Application Data

(63) Continuation of application No. PCT/EP2018/053903, filed on Feb. 16, 2018.

(30) Foreign Application Priority Data

Mar. 2, 2017  (DE) .................... 10 2017 203 445.9

(51) Int. Cl.
*F02D 41/14* (2006.01)
*F02D 41/00* (2006.01)
(Continued)

(52) U.S. Cl.
CPC ..... *F02D 41/1406* (2013.01); *F02D 41/0007* (2013.01); *F02D 41/2464* (2013.01);
(Continued)

(58) Field of Classification Search
CPC .. F02D 41/0007; F02D 41/14; F02D 41/1406; F02D 41/2464; F02D 2200/024;
(Continued)

(56) References Cited

U.S. PATENT DOCUMENTS 6,155,049 A   12/2000  Bischoff
6,240,894 B1   6/2001  Enoki et al.
(Continued)

FOREIGN PATENT DOCUMENTS

DE   19808832 A1   9/1999
DE   102007025077 A1   12/2008
(Continued)

OTHER PUBLICATIONS

International Search Report and Written Opinion dated May 22, 2018 from corresponding International Patent Application No. PCT/EP2018/053903.
(Continued)

*Primary Examiner* — Jesse S Bogue
*Assistant Examiner* — Loren C Edwards

(57) ABSTRACT

The disclosed embodiments relate to a method and to a device for controlling an internal combustion engine supercharged by an exhaust-gas turbocharger. The method includes: determining the time duration required for a specific internal combustion engine in operation, at a current operating point and with a predefined combination of settings of switching actuators, to perform an increase of the charge pressure from a current charge pressure to a target charge pressure associated with a target operating point; comparing the determined time duration with a multiplicity of stored time durations, which are each assigned to a predefined different combination of the settings of the switching actuators; and controlling the internal combustion engine with that combination of the settings of the switching actuators which permits the quickest increase of the charge pressure to the target charge pressure.

11 Claims, 1 Drawing Sheet

(51) Int. Cl.
*F02D 41/24* (2006.01)
*F02M 35/10* (2006.01)

(52) U.S. Cl.
CPC .. *F02M 35/1038* (2013.01); *F02M 35/10157* (2013.01); *F02D 2200/024* (2013.01)

(58) Field of Classification Search
CPC .. F02D 2250/12; F02D 2250/14; F02D 23/00; F02M 35/10157; F02M 35/1038; F02B 37/18; F02B 37/183; F02B 37/186; F02B 37/22; F02B 37/24
USPC ........ 60/602, 605.1, 611; 701/102, 103, 104
See application file for complete search history.

(56) References Cited

U.S. PATENT DOCUMENTS

| | | | |
|---|---|---|---|
| 6,584,772 B2 * | 7/2003 | Haupt | ................ F02B 37/24 60/602 |
| 9,771,883 B1 | 9/2017 | Haskara et al. | |
| 2010/0058757 A1 * | 3/2010 | Mueller | .............. F02D 41/0007 60/602 |
| 2016/0237932 A1 | 8/2016 | Long et al. | |
| 2017/0276074 A1 | 9/2017 | Haskara et al. | |

FOREIGN PATENT DOCUMENTS

| | | |
|---|---|---|
| DE | 102015204155 B3 | 8/2016 |
| DE | 102016101859 A1 | 8/2016 |
| KR | 20090092294 A | 8/2009 |
| KR | 20140126667 A | 10/2014 |
| WO | 2008083771 A1 | 7/2008 |
| WO | 2015058875 A1 | 4/2015 |

OTHER PUBLICATIONS

German Office Action dated 24 Sep. 2017 for corresponding German Patent Application No. 10 2017 203 445.9.
Korean Office Action dated Jul. 1, 2020 for the counterpart Korean Patent Application No. 10-2019-7027348.
Korean Notice of Allowance dated Oct. 27, 2020 for the counterpart Korean Patent Application No. 10-2019-7027348.

* cited by examiner

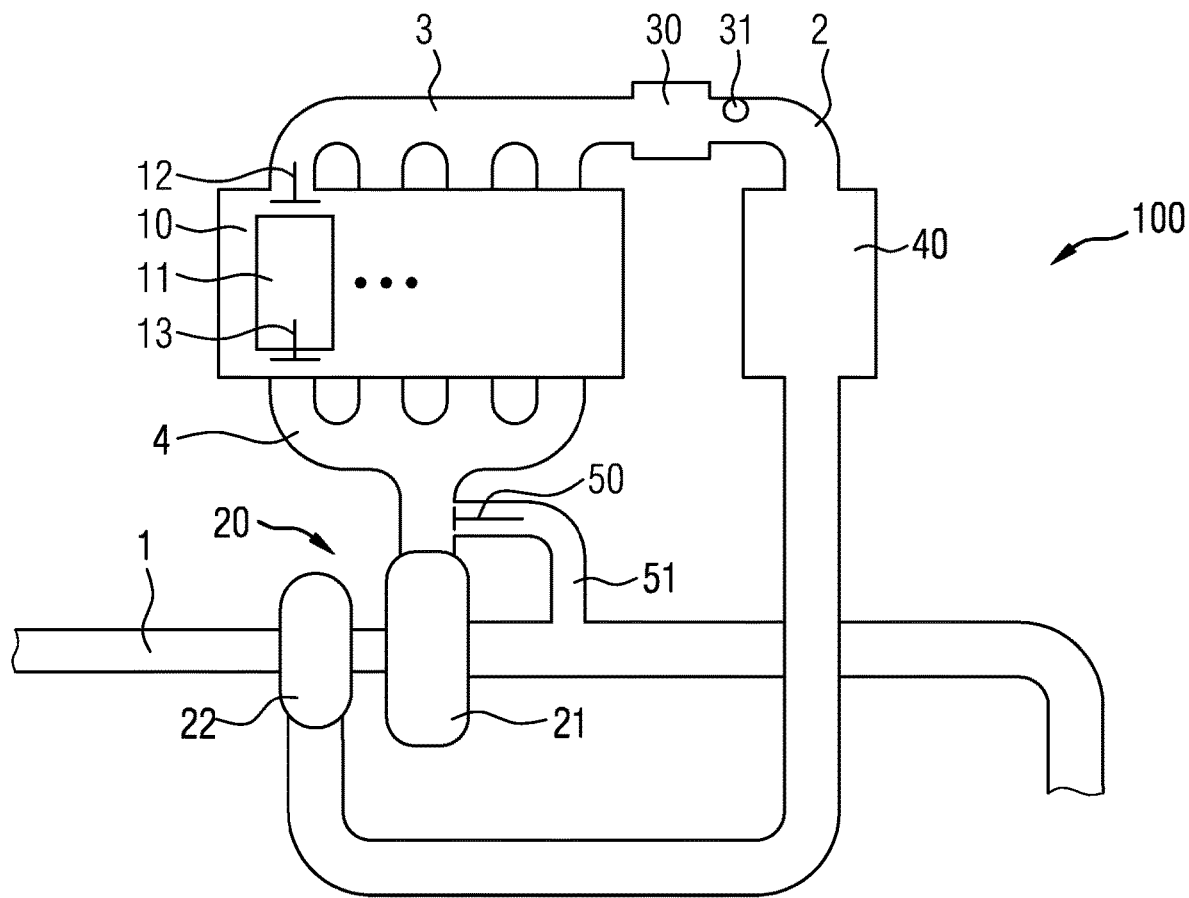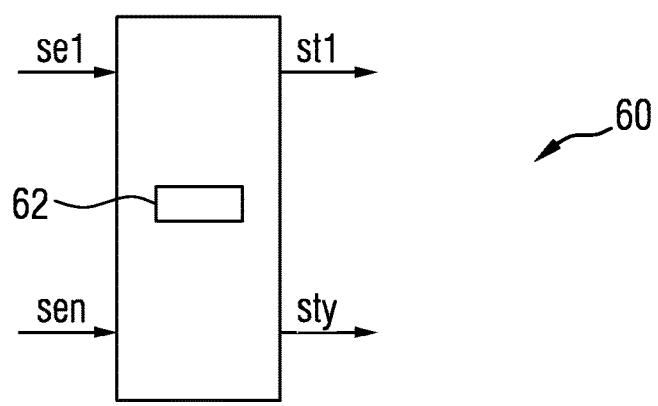

METHOD AND DEVICE FOR CONTROLLING AN INTERNAL COMBUSTION ENGINE SUPERCHARGED BY AN EXHAUST-GAS TURBOCHARGER

CROSS REFERENCE TO RELATED APPLICATIONS

This application is a continuation of International application No. PCT/EP2018/053903 filed Feb. 16, 2018, which claims priority to German patent application No. 10 2017 203 445.9, filed Mar. 2, 2017, each of which is hereby incorporated by reference.

FIELD OF INVENTION

The invention relates to a method and to a device for controlling an internal combustion engine supercharged by an exhaust-gas turbocharger.

BACKGROUND

Motor vehicles and the internal combustion engines installed therein are being equipped with ever-increasing numbers of actuators in order to minimize their fuel consumption and pollutant emissions and maximize vehicle performance. These actuators include continuously acting actuators, e.g. the throttle valve which controls the air mass flow into the intake manifold, the phase adjusters of the camshafts and the wastegate actuators of a turbocharger, as well as switching actuators, which have a finite number of possible settings, e.g. the actuators of an automatic gear shift, the actuators of a travel changeover mechanism for the cylinder valves, and actuators which may switch off torque consumers, e.g. the actuators of a mechanically driven air-conditioning compressor.

If there is a demand for a vehicle acceleration initiated by the driver by actuation of the gas pedal, the engine control device first of all selects a new combination of the settings of the switching actuators, depending on the current state of the vehicle, as a rough selection of the new operating point and then performs fine adjustment to the operating point with the aid of the continuously acting actuators. Primarily with the aim of minimizing fuel consumption and/or pollutant emissions, an attempt is made here to operate the vehicle for as long as possible in combinations of the settings of the switching actuators which save fuel and/or are advantageous for emissions.

In previous practice, the choice of the combination of the settings of the switching actuators is always a compromise between fuel consumption during the operating mode that is possible in steady-state conditions and the time required to reach the desired new operating point. A changeover of the settings of the switching actuators is generally controlled by the engine control device using stored characteristic maps, which have been populated with data entirely in a spirit of compromise, using a reference engine, in respect of fuel consumption, pollutant emissions and time to reach the desired new operating point.

However, in boundary zones of an operating range that may be achieved in steady-state conditions with a combination of the settings of the switching actuators determined in this way, the response behavior of the vehicle may deteriorate sharply. In comparison with a combination of the settings of the switching actuators which is less suitable for fuel saving and/or less advantageous for emissions, the driver may notice that it takes longer for the vehicle to achieve the acceleration demanded.

SUMMARY

The object of the invention is to specify a method for controlling an internal combustion engine supercharged by an exhaust-gas turbocharger, in which a change of the operating point is improved.

This problem is solved by a method having the features described herein. Advantageous embodiments and refinements of the invention are specified below, including a device for controlling an internal combustion engine supercharged by an exhaust-gas turbocharger.

In the present invention, the following steps are carried out to control an internal combustion engine supercharged by an exhaust-gas turbocharger:

determining the time duration required for a specific internal combustion engine in operation, at a current operating point and with a predefined combination of the settings of switching actuators, to carry out an increase of the charge pressure from a current charge pressure to a target charge pressure associated with a target operating point, comparing the determined time duration with a multiplicity of stored time durations, which are each assigned to a predefined different combination of the settings of the switching actuators, and controlling the internal combustion engine with that combination of the settings of the switching actuators which permits the quickest increase of the charge pressure to the target charge pressure.

The advantages of the invention include in that the engine control device of the internal combustion engine takes into account the properties of the specific internal combustion engine in the event of a change of the operating point. By determining the time duration which the specific internal combustion engine requires, at a current operating point and with a predefined combination of the settings of switching actuators, to carry out an increase of the charge pressure from a current charge pressure to a target charge pressure associated with a target operating point, and comparing the time duration determined with a multiplicity of stored time durations, each of which is assigned to a predefined different combination of the settings of the switching actuators, engine control may be performed with that combination of the settings of the switching actuators which permits the quickest increase of the charge pressure to the target charge pressure to be performed for the specific internal combustion engine under consideration.

When a change in the operating point is intended, the engine control unit accordingly does not decide according to predefined fixed changeover rules determined in advance by means of a reference engine but, in addition to these changeover rules, takes into account the properties of the specific internal combustion engine under consideration, which may differ, owing to production run scatter and aging effects, from the properties of the reference engine, using which the predefined fixed changeover rules have been compiled.

Determination of a parameter which describes the response behavior of the internal combustion engine at the current operating point may preferably be performed as part of the determination of the time duration required for a specific internal combustion engine, at the current operating point and with the predefined combination of the settings of switching actuators, to achieve an increase of the charge pressure from the current charge pressure to the target charge pressure.

The determination of said time duration is preferably performed while taking into account the parameter which describes the response behavior of the internal combustion engine at the current operating point, a maximum charge pressure that may be achieved at the present operating point, and the current charge pressure and target charge pressure.

Said time duration is preferably determined in accordance with the following relation:

$$\Delta t = -\frac{1}{A} \cdot \ln(1 - (p_{soll} - p_0)/(p_{max} - p_0))$$

where $\Delta t$ is the time duration until the target charge pressure is achieved, A is the parameter which describes the response behavior of the internal combustion engine at the current operating point, $p_{soll}$ is the target charge pressure, $p_{max}$ is the maximum charge pressure that may be achieved with the current combination of the settings of the switching actuators, and $p_0$ is the current charge pressure.

The determination of the parameter which describes the response behavior of the internal combustion engine at the current operating point is preferably performed in accordance with the following relation:

$$A = \dot{p}(t_0)/(p_{max} - p_0),$$

where A is the parameter which describes the response behavior of the internal combustion engine at the current operating point, $\dot{p}(t_0)$ is the charge pressure gradient at time $t_0$ at the start of charge pressure development, $p_{max}$ is the maximum charge pressure that may be achieved with the current combination of the settings of the switching actuators, and $p_0$ is the current charge pressure.

The current charge pressure $p_0$ is preferably measured by means of a charge pressure sensor.

The maximum charge pressure $p_{max}$ that may be achieved with the current combination of the settings of the switching actuators is preferably stored in a non-volatile manner in a memory to which the engine control device has access before the time duration is determined.

BRIEF DESCRIPTION OF THE DRAWING

Further advantageous properties of the invention will become apparent from the illustrative explanation given below with reference to the FIGURE, which shows a block diagram of a device for controlling an internal combustion engine supercharged by an exhaust-gas turbocharger.

DETAILED DESCRIPTION

This device contains a drive train 100, which contains an internal combustion engine 10 supercharged by an exhaust-gas turbocharger 20. The internal combustion engine 10 has one or more cylinders 11, to each of which at least one inlet valve 12 and at least one outlet valve 13 are assigned. Each of these inlet valves and/or outlet valves has a plurality of valve travels, between which it may be switched.

The exhaust-gas turbocharger 20 comprises a turbine 21 and a compressor 22. The compressor 22 is connected on the inlet side to a fresh air duct 1 and makes available compressed fresh air on the outlet side. This air is supplied via a charge air cooler 40 to a charge air section 2 and, from there, is transferred to an intake manifold 3 via a throttle valve 30. From the intake manifold, the compressed air is transferred to the respective cylinder 11 via the respective inlet valve 12. This air is used to burn the fuel introduced into the cylinder.

The exhaust gases formed during this combustion process pass through the outlet valve 13, via an exhaust manifold 4, to the turbine 21 of the exhaust-gas turbocharger 20. There, they drive a turbine wheel, which is connected by a shaft to a compressor wheel, which is arranged in the compressor and is thus driven by the turbine wheel via said shaft.

Moreover, the device shown has a wastegate duct 51, which may be adjusted continuously between a fully open state and a closed state by means of a wastegate valve 50, and a charge pressure sensor 31 arranged in the charge air section 2.

Furthermore, the device shown in FIG. 1 has an engine control device 60, which is designed to control the internal combustion engine 10 or a multiplicity of actuators of the internal combustion engine 10. This engine control device 60 is supplied with a multiplicity of sensor signals se1, . . . , sen. Using these sensor signals, a stored operating program and additional data stored in a memory 62, the engine control device 60 determines control signals st1, . . . , sty, which are provided for the control of said actuators of the internal combustion engine. The data stored in the memory 62 include the data of an air path model, which contains information on settings of the actuators associated with a multiplicity of air pressures. This information on actuator settings includes information on the different valve travels of the inlet valves 12 and/or of the outlet valves 13 of the cylinders 11.

The engine control device 60 is designed to carry out a method for controlling an internal combustion engine supercharged by an exhaust-gas turbocharger, in which the following steps are carried out:

determining the time duration required for a specific internal combustion engine in operation, at a current operating point and with a predefined combination of the settings of switching actuators, to carry out an increase of the charge pressure from a current charge pressure to a target charge pressure associated with a target operating point, comparing the determined time duration with a multiplicity of stored time durations, which are each assigned to a predefined different combination of the settings of the switching actuators, and controlling the internal combustion engine with that combination of the settings of the switching actuators which permits the quickest increase of the charge pressure to the target charge pressure.

As part of the determination of the time duration required for a specific internal combustion engine in operation, at a current operating point and with a predefined combination of the settings of switching actuators, to carry out an increase of the charge pressure from a current charge pressure to a target charge pressure associated with a target operating point, a parameter A which describes the response behavior of the specific internal combustion engine at the current operating point is determined.

The time duration is determined while taking into account the abovementioned parameter A which describes the response behavior of the specific internal combustion engine at the current operating point, a maximum charge pressure $p_{max}$ that may be achieved at the current operating point, the current charge pressure $p_0$ and the target charge pressure $p_{soll}$, using the following relation:

$$\Delta t = -\frac{1}{A} \cdot \ln(1 - (p_{soll} - p_0)/(p_{max} - p_0))$$

In this context: Δt is the time duration until the target charge pressure is achieved, A is the parameter which describes the response behavior of the internal combustion engine at the current operating point, $p_{soll}$ is the target charge pressure, $p_{max}$ is the maximum charge pressure that may be achieved with the current combination of the settings of the switching actuators, and $p_0$ is the current charge pressure.

The parameter A which describes the response behavior of the internal combustion engine at the current operating point is determined using the charge pressure gradient $\dot{p}(t_0)$ at time $t_0$ at the start of charge pressure development, the maximum charge pressure $p_{max}$ that may be achieved with the current combination of the settings of the switching actuators, and the current charge pressure $p_0$, in accordance with the following relation:

$$A = \dot{p}(t_0)/(p_{max} - p_0).$$

In this context: A is the parameter which describes the response behavior of the internal combustion engine at the current operating point, $\dot{p}(t_0)$ is the charge pressure gradient at time to at the start of charge pressure development, $p_{max}$ is the maximum charge pressure that may be achieved with the current combination of the settings of the switching actuators, and $p_0$ is the current charge pressure.

The current charge pressure $p_0$ is measured by means of a charge pressure sensor 31, which is arranged in the region of the charge air section 2.

The maximum charge pressure $p_{max}$ that may be achieved with the current combination of the settings of the switching actuators is stored in a memory 62 before determining the time duration and may be retrieved from there by the engine control device when required.

With the procedure described above, the properties of the specific internal combustion engine under consideration are taken into account in deciding the question as to how a change of operating point may be carried out as quickly as possible.

After a driver demand for vehicle acceleration, for example, the engine control device selects a modified combination of the settings of the switching actuators as a rough selection of the newly required operating point and then performs fine adjustment to the new operating point with the aid of the continuously acting actuators if the check performed came to the conclusion that the desired change of operating point could be performed most quickly by means of this modified combination of the settings of the switching actuators.

By taking into account the properties of the specific internal combustion engine under consideration, it is possible, for example, to allow for the fact that one subsystem that limits the response behavior of the internal combustion engine is often the gas exchange system. In particular, the exhaust-gas turbocharger of an internal combustion engine may require a very long time to reach a desired new operating point at engine operating points with a low exhaust gas mass flow. Owing to the moment of inertia of the turbocharger rotor assembly and the wide turbocharger speed range used, the exhaust-gas turbocharger is the slowest actuator of the gas exchange system in terms of an actuator for setting a desired air mass flow through the compressor. In contrast, the duration of actuation of the control system for the wastegate valve position is negligibly short.

If a spark ignition engine is to increase the engine torque from a certain engine operating point determined by the engine speed and the engine torque, it has to correspondingly increase the cylinder air mass for this purpose. It is possible, for example, that it implements this in less than half a second in the full engine mode, i.e. with powering of all the cylinders and in the intake mode by opening the throttle valve, while in the supercharged half-engine mode, i.e. with powering of only every second cylinder, it requires several seconds for this because it has to accelerate the turbocharger to a higher charger speed for this purpose. Such a large difference in the implementation time of two acceleration requests, which are identical for the driver, may be unacceptable to the driver. In the case of the present invention, it is determined, taking into account the properties of the specific internal combustion engine under consideration, by means of which combination of the switching actuators the desired change of operating point may be carried out most quickly, and a changeover to that combination of switching actuators by means of which the desired change of operating point may be performed most quickly is implemented.

Moreover, the response behavior of a specific internal combustion engine may differ significantly from the response behavior of the reference engine owing to production run scatter and aging effects. In particular, a specific engine may require significantly more time than the reference engine for a desired change of the operating point with a given current combination of the settings of the switching actuators, and this may be unacceptable for the driver.

In the case of the present invention, this is avoided by the fact that the engine control device may determine how long it will take for the specific engine to carry out a desired change of the operating point with the current combination of the settings of the switching actuators so that it may decide whether a change should be made to a different combination of the settings of the switching actuators with a shorter implementation time.

In particular, the efficiencies of exhaust-gas turbochargers may differ significantly from those of the exhaust-gas turbocharger of the reference engine owing to production run scatter and aging effects. This may have the effect that a desired increase of the charge pressure on the specific engine may take significantly longer than on the reference engine. In the case of the present invention, this disadvantage is avoided since the engine control device may determine how long it will take for the specific engine under consideration to carry out a desired increase of the charge pressure and hence of the cylinder air mass with the current combination of the settings of the switching actuators and may decide whether a change should be made to a different combination of the settings of the switching actuators with a shorter implementation time.

Engine operating points at which a change to a different combination of the settings of the switching actuators might be considered owing to a low turbocharger efficiency of the specific engine are distinguished by the fact that the throttle valve is fully open and the wastegate is fully closed to enable the cylinder air mass to rise with the maximum speed with the current combination of the settings of the switching actuators. Based on the gas exchange system with a given combination of the settings of the switching actuators of the vehicle, this corresponds to a full load operating point. Starting from the respective charge pressure directly after the opening of the throttle valve, the closed wastegate ensures that the entire exhaust gas mass flow corresponding to this charge pressure is passed through the turbocharger turbine and accelerates the compressor impeller. The charge pressure and hence also the exhaust gas mass flow, the exhaust gas backpressure and the turbocharger speed increase correspondingly. The system is in a state of positive feedback if the throttle valve remains open and the wastegate remains closed and the charge pressure rises continuously. Owing to the plateauing of the intake capacity of the engine with increasing exhaust gas backpressure and the shift in the turbocharger operating point into a range with a lower efficiency, the charge air gradient decreases until a constant maximum charge pressure level is achieved.

Depending on the engine operating point, the engine may be operated either at this constant maximum charge pressure, if none of the permitted limits of the engine operating variables, such as the turbocharger speed, compressor outlet temperature, exhaust gas temperature, cylinder air mass, engine torque etc. is exceeded, or may not be operated at this constant maximum charge pressure if one or more of the permitted limits of said engine operating variables is/are exceeded and the engine would therefore be damaged.

Irrespective of whether the engine may be operated at the maximum charge pressure that may be achieved in steady-state conditions with a fully open throttle valve and a fully closed wastegate, the characteristic or at least the beginning of the characteristic of the charge pressure, starting from the charge pressure $p_0$ at the time when the throttle valve opens and the wastegate closes for a time t may be well described by the following exponential function:

$$p = p_0 + (p_{max} - p_0) \cdot (1 - e^{A(t_0 - t)}) \quad (1)$$

The time $t_0$ when the throttle valve opens and the wastegate closes is known to the engine control device.

The charge pressure $p_0$ at the time to when the throttle valve opens and the wastegate closes is measured by means of the charge pressure sensor on the specific engine and is therefore likewise known to the engine control device.

Moreover, it is assumed that the maximum charge pressure $p_{max}$ that may be achieved in steady-state conditions, which is determined by means of the reference engine with the throttle valve fully open and the wastegate fully closed, is stored in a model in the memory 62 of the engine control device 60 and has been adapted, if required, for the specific engine and is therefore known to the engine control device.

To predict the characteristic of the charge pressure p, it is furthermore necessary to determine the parameter A, which describes the response behavior of the specific engine at the respective operating point under consideration. In order to reflect the behavior of the specific engine with its differences from the reference engine at the respective operating point, the parameter A is determined from a measurement on the specific engine at the respective operating point.

The following relation is obtained as the charge pressure gradient from the derivative of the above-indicated equation (1) with respect to time:

$$\dot{p}(t) = \frac{dp}{dt} = (p_{max} - p_0) \cdot (A \cdot e^{A(t_0 - t)}) \quad (2)$$

The following is obtained as the charge pressure gradient at time to at the start of charge pressure development:

$$\dot{p}(t_0) = (p_{max} - p_0) \cdot (A \cdot e^{A(t_0 - t_0)}) = (p_{max} - p_0) \cdot A \quad (3)$$

From this, it is possible to determine the parameter A at the current operating point as:

$$A = \frac{\dot{p}(t_0)}{p_{max} - p_0} \quad (4)$$

The charge pressure p is measured for a duration $\Delta t_0$ immediately after the time to at which the throttle valve opens and the wastegate closes. From these measured pressures and the times associated therewith, the charge pressure gradient for this duration $\Delta t_0$ is determined as an approximation of the charge pressure gradient for the time to, e.g. as the slope of a line of regression determined by means of the Gaussian least squares method.

With the determination of the parameter A for the current operating point in accordance with equation (4), it is possible at time $t_0 + \Delta t_0$ to predict the characteristic of the charge pressure p in accordance with equation (1) beyond the time $t_0 + \Delta t_0$.

When rearranged for $(t - t_0)$, equation (1) describes the time duration in which a desired charge pressure p is achieved, starting from $p_0$.

$$(t - t_0) = -\frac{1}{A} \cdot \ln\left(1 - \frac{p - p_0}{p_{max} - p_0}\right) \quad (5)$$

When applied to the target charge pressure $p_{soll}$ which is to be achieved with the desired operating point shift, the duration of the implementation of the desired operating point shift with the current combination of the settings of the switching actuators $\Delta t_{ctl}$ is obtained as follows.

$$\Delta t_{ctl} = (t(p_{soll}) - t_0) = -\frac{1}{A} \cdot \ln\left(1 - \frac{p_{soll} - p_0}{p_{max} - p_0}\right) \quad (6)$$

If this predicted implementation duration is less than a maximum permissible implementation duration stored in corresponding characteristic maps in the memory 62 of the engine control unit 60, the current combination of the settings of the switching actuators is retained for the duration of the current operating point shift.

However, if this predicted implementation duration is greater than a maximum permissible implementation duration stored in corresponding characteristic maps in the memory 62 of the engine control unit 60, a switch is made immediately to a different combination of the settings of the switching actuators in order to implement the currently desired operating point shift as quickly as possible.

By means of the procedure described above, the switching strategy for the switching actuators of the vehicle is, after all this, adapted to the specific vehicle by determination of the time which the specific engine under consideration requires at the current operating point to implement the currently desired change of operating point and comparison of this time with a maximum acceptable duration stored in the engine control unit, and a fuel saving and comfortable vehicle operating mode is made possible.

The invention claimed is:

1. A method for controlling an internal combustion engine supercharged by an exhaust-gas turbocharger, comprising:
   determining a time duration required for the internal combustion engine in operation, at a current operating point and with a predefined combination of settings of switching actuators, to carry out an increase of charge pressure from a current charge pressure to a target charge pressure associated with a target operating point, comparing the determined time duration with a multiplicity of stored time durations, the multiplicity of stored time durations are each assigned to a predefined different combination of the settings of the switching actuators, and controlling the internal combustion engine with a combination of the settings of the switching actuators which permits a quickest increase of the charge pressure to the target charge pressure, wherein the determining the time duration which the internal combustion engine requires, at the current operating point and with the predefined combination of the settings of the switching actuators, to carry out the increase of the charge pressure from the current charge pressure to the target charge pressure, is performed in accordance with the following relation:

$$\Delta t = -\frac{1}{A} \cdot \ln(1 - (p_{soll} - p_0)/(p_{max} - p_0))$$

where $\Delta t$ is the time duration until the target charge pressure is achieved, A is a parameter which describes a response behavior of the internal combustion engine at the current operating point, $p_{soll}$ is the target charge pressure, $p_0$ is the current charge pressure, and $p_{max}$ is a maximum charge pressure that may be achieved with a current combination of the settings of the switching actuators.

2. The method as claimed in claim 1, further comprising determining the parameter which describes the response behavior of the internal combustion engine at the current operating point in accordance with the following relation:

$$A = \dot{p}(t_0)/(p_{max} - p_0),$$

where A is the parameter which describes the response behavior of the internal combustion engine at the current operating point, $\dot{p}(t_0)$ is a charge pressure gradient at time $t_0$ at a start of charge pressure development, $p_{max}$ is the maximum charge pressure which may be achieved with the current combination of the settings of the switching actuators, and $p_0$ is the current charge pressure.

3. The method as claimed in claim 1, wherein the current charge pressure is measured by a charge pressure sensor.

4. The method as claimed in claim 1, further comprising storing the maximum charge pressure that may be achieved with the current combination of the settings of the switching actuators in a memory before determining the time duration.

5. A device for controlling an internal combustion engine supercharged by an exhaust-gas turbocharger, comprising:

an engine control device which is configured to determine a time duration required for the internal combustion engine in operation, at a current operating point and with a predefined combination of settings of switching actuators, to increase the a charge pressure from a current charge pressure to a target charge pressure associated with a target operating point, compare the determined time duration with a multiplicity of stored time durations, the multiplicity of stored time durations are each assigned to a predefined different combination of the settings of the switching actuators, and control the internal combustion engine with a combination of the settings of the switching actuators which permits the a quickest increase of the charge pressure to the target charge pressure, wherein the determination of the time duration which the internal combustion engine requires, at the current operating point and with the predefined combination of the settings of the switching actuators, to increase the charge pressure from the current charge pressure to the target charge pressure, is performed in accordance with the following relation:

$$\Delta t = -\frac{1}{A} \cdot \ln(1 - (p_{soll} - p_0)/(p_{max} - p_0))$$

where $\Delta t$ is the time duration until the target charge pressure is achieved, A is a parameter which describes a response behavior of the internal combustion engine at the current operating point, $p_{soll}$ is the target charge pressure, $p_0$ is the current charge pressure, and $p_{max}$ is a maximum charge pressure that may be achieved with a current combination of the settings of the switching actuators.

6. The device as claimed in claim 5, wherein the determination of the parameter which describes the response behavior of the internal combustion engine at the current operating point is performed in accordance with the following relation:

$$A = \dot{p}(t_0)/(p_{max} - p_0),$$

where A is the parameter which describes the response behavior of the internal combustion engine at the current operating point, $\dot{p}(t_0)$ is a charge pressure gradient at time $t_0$ at a start of charge pressure development, $p_{max}$ is the maximum charge pressure which may be achieved with the current combination of the settings of the switching actuators, and $p_0$ is the current charge pressure.

7. The device as claimed in claim 5, further comprising memory associated with the engine control device, wherein the maximum charge pressure that may be achieved with the current combination of the settings of the switching actuators is stored in the memory before the time duration is determined.

8. The device as claimed in claim 5, further comprising a charge pressure sensor, wherein the current charge pressure is measured by the charge pressure sensor.

9. A device for controlling an internal combustion engine supercharged by an exhaust-gas turbocharger, the internal combustion engine including a plurality of switching actuators and a plurality of sensors, comprising:

an engine control circuit having a plurality of inputs connected to receive sensor signals from the plurality of sensors, a plurality of outputs which provide control signals to the plurality of switching actuators, and memory having stored therein a program which, based at least partly on the sensor signals, configures the engine control circuit to perform a method comprising:

determining a time duration required for the internal combustion engine in operation, at a current operating point and with a predefined combination of settings of the switching actuators, to increase a charge pressure from a current charge pressure to a target charge pressure associated with a target operating point, comprising determining a parameter which describes a response behavior of the internal combustion engine at the current operating point, comparing the determined time duration with a multiplicity of stored time durations, the multiplicity of stored time durations are each assigned to a predefined different combination of the settings of the switching actuators, and controlling the internal combustion engine with a combination of the settings of the switching actuators which permits a quickest increase of the charge pressure to the target charge pressure, wherein the determination of the parameter which describes the response behavior of the internal combustion engine at the current operating point is performed in accordance with the following relation:

$$A = \dot{p}(t_0)/(p_{max} - p_0),$$

where A is the parameter which describes the response behavior of the internal combustion engine at the current operating point, $\dot{p}(t_0)$ is a charge pressure gradient at time $t_0$ at a start of charge pressure development, $p_{max}$ is a maximum charge pressure which may be achieved with a current combination of the settings of the switching actuators, and $p_0$ is the current charge pressure.

10. The device as claimed in claim 9, wherein the time duration is determined based upon the parameter which describes the response behavior of the internal combustion engine at the current operating point, the maximum charge pressure that may be achieved with the current combination of the settings of the switching actuators, the current charge pressure, and the target charge pressure.

11. The device as claimed in claim 9, wherein the determination of the time duration which the internal combustion engine requires, at the current operating point and with the predefined combination of the settings of the switching actuators, to increase the charge pressure from the current charge pressure to the target charge pressure, is performed in accordance with the following relation:

$$\Delta t = -\frac{1}{A} \cdot \ln(1 - (p_{soll} - p_0)/(p_{max} - p_0))$$

where $\Delta t$ is the time duration until the target charge pressure is achieved, A is the parameter which describes the response behavior of the internal combustion engine at the current operating point, $p_{soll}$ is the target charge pressure, $p_0$ is the current charge pressure, and $p_{max}$ is the maximum charge pressure that may be achieved with the current combination of the settings of the switching actuators.

* * * * *